United States Patent
Peselli et al.

(10) Patent No.: US 9,938,630 B2
(45) Date of Patent: Apr. 10, 2018

(54) METHOD OF MAKING A TUBULAR CASING FOR AN UNDERWATER DEVICE, IN PARTICULAR A TORPEDO

(71) Applicant: LEONARDO S.P.A., Rome (IT)

(72) Inventors: Mauro Peselli, Carrara (IT); Francesco Lo Presti, Rome (IT)

(73) Assignee: LEONARDO S.P.A., Rome (IT)

( * ) Notice: Subject to any disclaimer, the term of this patent is extended or adjusted under 35 U.S.C. 154(b) by 75 days.

(21) Appl. No.: 15/215,370

(22) Filed: Jul. 20, 2016

(65) Prior Publication Data

US 2017/0022623 A1    Jan. 26, 2017

(30) Foreign Application Priority Data

Jul. 21, 2015 (IT) .................. 102015000036498

(51) Int. Cl.

| | |
|---|---|
| C25D 11/18 | (2006.01) |
| F42B 19/00 | (2006.01) |
| B29C 35/02 | (2006.01) |
| B29C 39/10 | (2006.01) |
| B63B 5/24 | (2006.01) |
| B29K 63/00 | (2006.01) |
| B29K 105/16 | (2006.01) |
| B29K 105/20 | (2006.01) |
| B29L 31/00 | (2006.01) |

(52) U.S. Cl.
CPC .............. *C25D 11/18* (2013.01); *B29C 35/02* (2013.01); *B29C 39/10* (2013.01); *F42B 19/00* (2013.01); *F42B 19/005* (2013.01); *B29K 2063/00* (2013.01); *B29K 2105/16* (2013.01); *B29K 2105/20* (2013.01); *B29L 2031/712* (2013.01); *B63B 2005/245* (2013.01)

(58) Field of Classification Search
CPC ............................... C25D 11/18; F42B 19/005
USPC ................... 205/198–204, 224, 229
See application file for complete search history.

(56) References Cited

FOREIGN PATENT DOCUMENTS

| | | |
|---|---|---|
| CN | 103482014 A | 1/2014 |
| CN | 203528747 U | 4/2014 |
| DE | 29606242 | 7/1997 |
| JP | H06 3100 A | 1/1994 |

OTHER PUBLICATIONS

Italian Search Report dated Mar. 8, 2016 from Italian Application No. 102015000036498 filed Jul. 21, 2015.

*Primary Examiner* — Brian W Cohen
(74) *Attorney, Agent, or Firm* — Dorsey & Whitney LLP

(57) ABSTRACT

A method of making a tubular casing for an underwater device, wherein a metal ring made of aluminum is subjected to an anodizing process that produces an insulating layer of aluminum oxide that covers it externally. The ring is coupled with a mold that defines a cylindrical surface on which the following are deposited: first layers of carbon fiber to produce a first cylindrically-shaped tubular element in carbon fiber provided with an end portion that engages a first groove of the ring; a layer of syntactic material configured to transfer radial forces; and second layers of carbon fiber to produce a second cylindrically-shaped tubular element in carbon fiber that covers the syntactic layer and is provided with an end portion that engages a first groove of the ring.

15 Claims, 4 Drawing Sheets

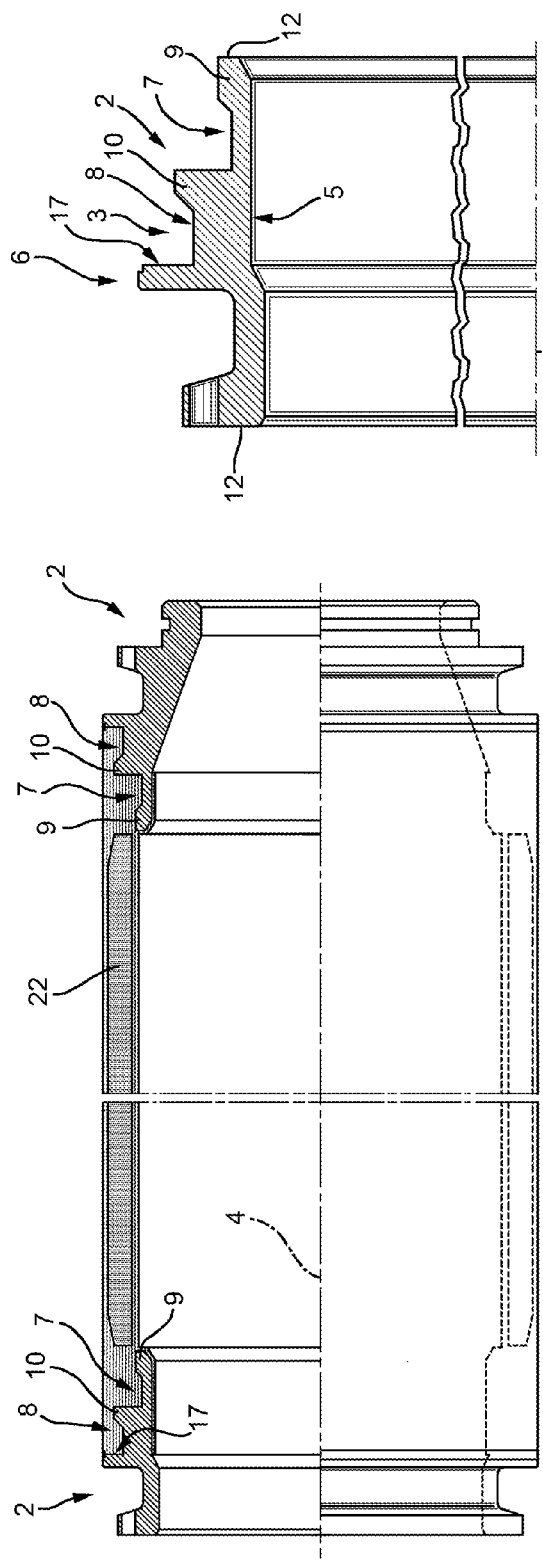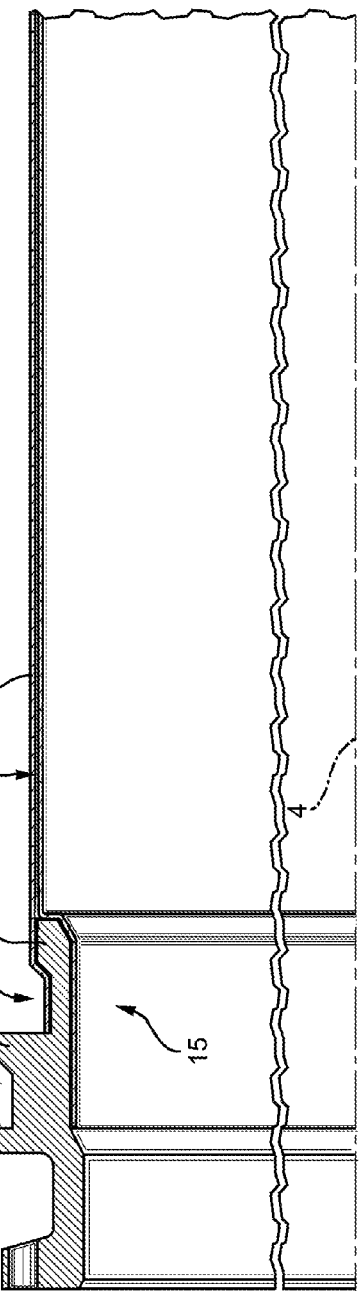

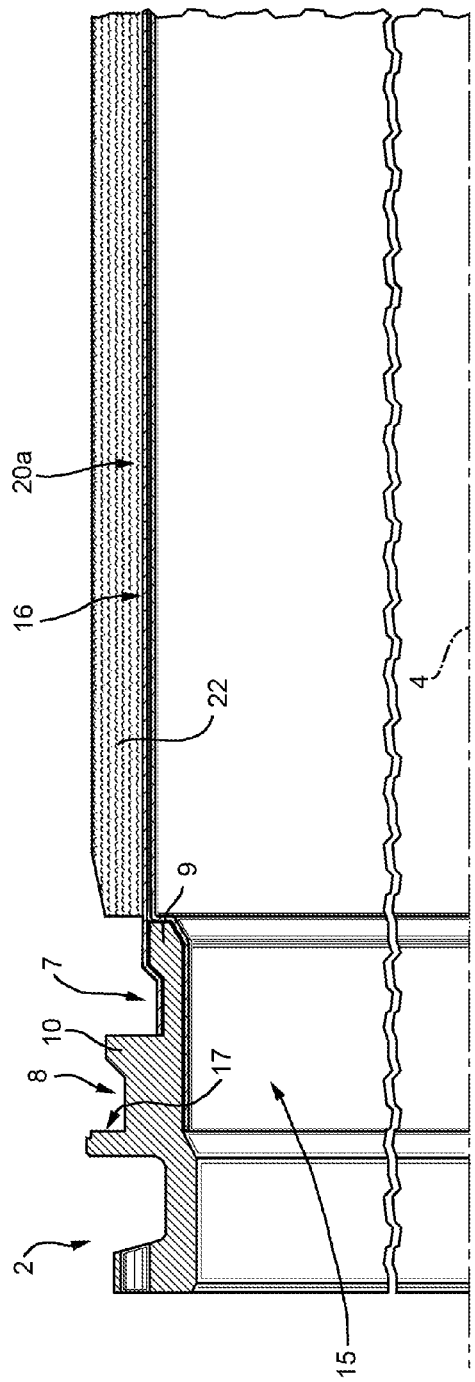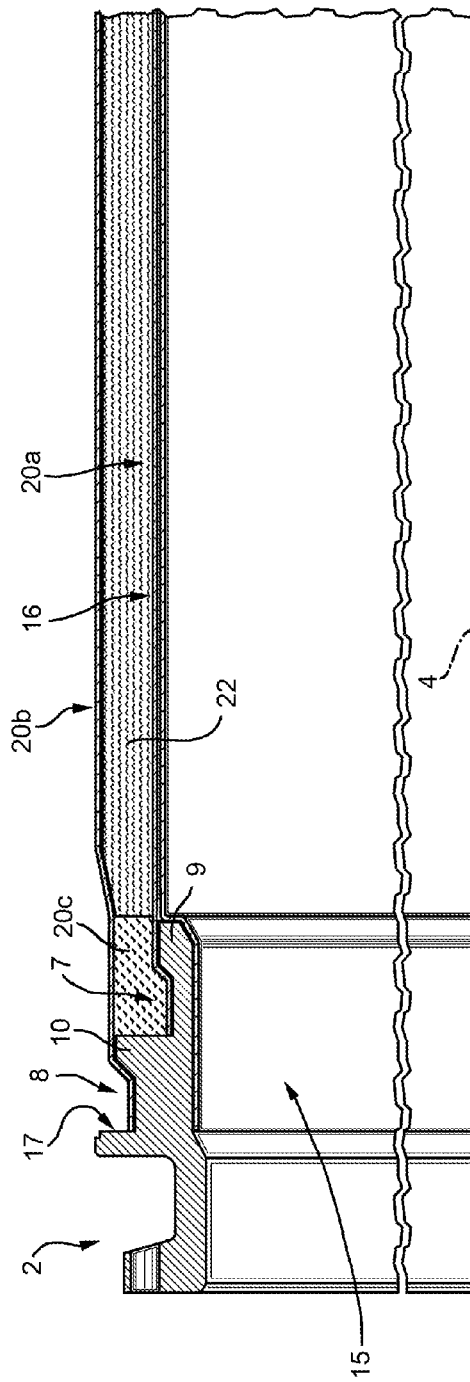

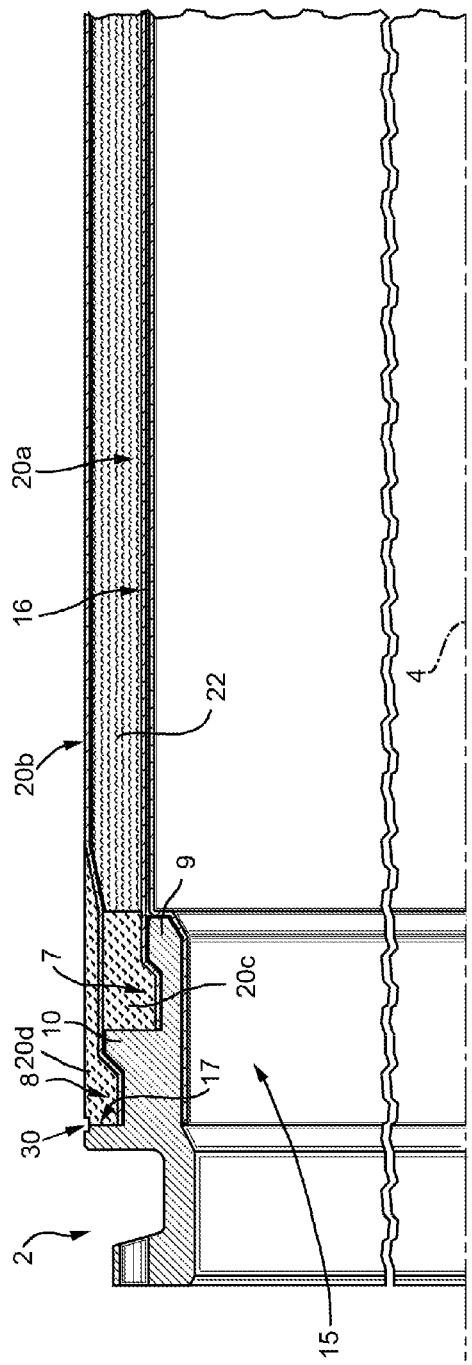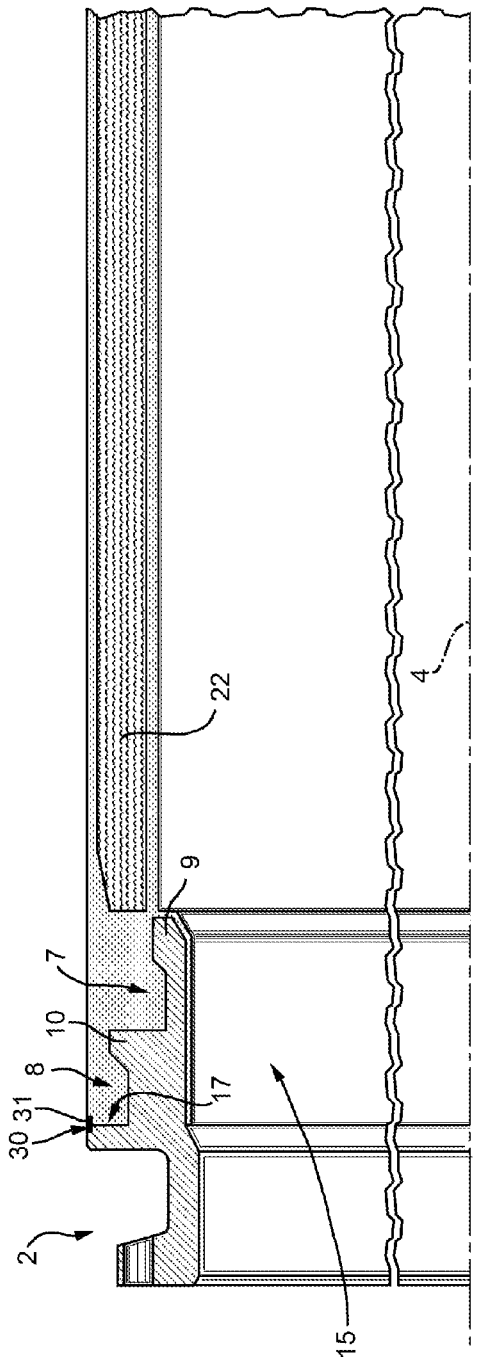

METHOD OF MAKING A TUBULAR CASING FOR AN UNDERWATER DEVICE, IN PARTICULAR A TORPEDO

The present invention relates to a method of making a tubular casing for an underwater device, in particular a torpedo.

BACKGROUND OF THE INVENTION

The casings for underwater devices, in particular torpedoes, must be possess a variety of characteristics, including: resistance to high pressures, water-tightness and being light.

In the military field, if the casing forms part of a torpedo, the required characteristics are even more stringent. For example, torpedoes are required to resist very high pressures in order to follow modern submarines that can reach increasingly deep operating depths. Torpedoes must be light in order to improve their performance in terms of speed, operating range and systems that can be installed on board.

The use of composite materials, especially carbon fibre, has been proposed for making these casings, as such materials have high mechanical resistance combined with low density. These materials can therefore advantageously replace those that are currently and which are mainly constituted by aluminum alloys.

The coupling between different portions of the casing is carried out using annular metal portions (typically in aluminum or aluminum alloys) that are connected to the portion made of carbon fibre. The connection between the aluminum and carbon fibre parts is quite critical and has limited many practical applications of carbon fibre in making torpedo casings.

According to the known art, the annular portions are provided with a complete conical wall on which an end portion of the carbon fibre casing engages; this stratagem allows creating a large adhesion surface between the conical surface in carbon fibre and the conical surface in aluminum.

Chinese patents CN203528747U and CN103482014 illustrate precisely the use of conical coupling surfaces.

This solution responds very well in many load situations, but is found to be very weak regarding axial loads generated by the pressure acting on the torpedo. Due to the axial loads, the conical surfaces tend to interpenetrate, generating circumferential mechanical loads that can damage the casing. The direct coupling of the carbon fibre on aluminum can also result in corrosion of the aluminum due to a series of chemical reactions between the different materials that, among other things, are both electrical conductors.

SUMMARY OF THE INVENTION

The need is therefore felt to produce a coupling system that enables stable coupling between the carbon fibre portion and the aluminum one, while ensuring high tightness and preventing alterations in the metal-aluminum interface due to chemical phenomena.

The foregoing object is achieved by the present invention in so far as it relates to a method of making a tubular casing for an underwater device, in particular a torpedo, characterized in that it comprises the following steps: preparing at least one metal ring comprising a tubular wall coaxial to an axis of symmetry; the tubular wall having, on the outside-facing surface, a first groove and a second groove spaced axially and radially with respect to the first groove; subjecting said metal ring to an anodizing process that produces an insulating layer of oxide that covers the outer surfaces of the metal ring; coupling said ring with a mould that defines a cylindrical supporting surface coaxial to said axis; depositing a plurality of first layers of fibre on the cylindrical portion of said mould and on a portion of said ring comprising said first groove to produce a first cylindrically-shaped tubular element in fibre provided with an end portion that engages said first groove; depositing on said first tubular element in fibre at least one layer of syntactic or equivalent material configured to transfer radial forces; depositing a plurality of second layers of fibre on the layer of syntactic material and on a portion of said ring comprising said second groove to produce a second cylindrically-shaped tubular element in fibre provided with an end portion that engages said second groove; said second tubular element in fibre housing the first tubular element in fibre and said layer of syntactic or equivalent material; subjecting said first and second tubular elements to a heating cycle so as to perform polymerization of the fibre that adheres intimately with the layer of syntactic material, producing said tubular casing in which a solidified portion of fibre is provided internally with an intermediate portion formed by the syntactic material and having an end portion that engages the first and the second groove; and removing said mould from said tubular casing.

BRIEF DESCRIPTION OF THE DRAWINGS

The invention will now be described with reference to the accompanying drawings in which:

FIG. 1 shows a first step of the method according to the present invention;

FIG. 2 shows a second step of the method according to the present invention;

FIG. 3 shows a third step of the method according to the present invention;

FIG. 4 shows a fourth step of the method according to the present invention;

FIG. 5 shows a fifth step of the method according to the present invention;

FIG. 6 shows a sixth step of the method according to the present invention;

FIG. 8 shows a tubular casing produced according to the method of the present invention.

DETAILED DESCRIPTION OF THE INVENTION

Figure 7:
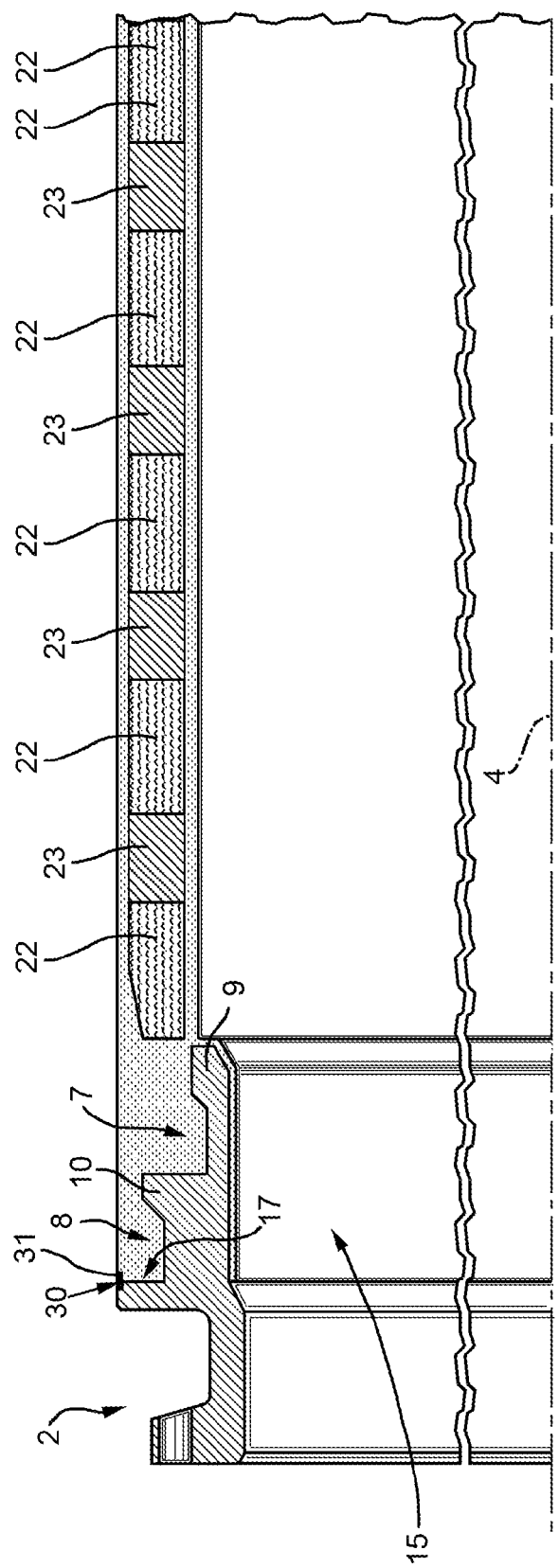
FIG. 7 shows a variant of the method according to the present invention.

FIG. 1 shows a first step of the method of making a tubular casing for an underwater device, in particular a torpedo, according to the present invention.

According to the present invention, a metal ring 2 (FIG. 1) made of aluminum or aluminum alloys and comprising a tubular wall 3 coaxial to an axis of symmetry 4 (FIG. 8), is prepared. Alternatively, the ring 2 could be made of other metals such as, for example, magnesium, titanium or stainless steel. The tubular wall is delimited by a substantially cylindrical surface 5 facing towards axis 4 and by an outside-facing surface 6 shaped by a plurality of notches.

In particular, surface 6 defines a first annular groove 7 and a second annular groove 8 spaced axially and radially with respect to the first groove 7.

In greater detail, the first groove 7 is limited, on a first side facing the outside of the annular body by a first tooth 9; the first and second grooves 7 and 8 are separated in radial and axial directions by a portion of the annular body that forms a second tooth 10, which limits the first groove 7 on a second side.

Initially, the ring 2 is subjected to an anodizing process that produces an insulating layer 12 (not shown to scale) of aluminum oxide that covers all the outer surfaces of the metal ring 2.

The ring 2 is then coupled with a mould 15 (of known type and therefore shown schematically—FIG. 2) that defines a cylindrical supporting surface 16 coaxial to the axis 4. The mould 15 is usually defined by a collapsible tube expander equipped with a plurality of sectors that, when arrange in the expanded position, define the cylindrical surface 16, which has a radius substantially equal to the internal radius of the ring 2.

Then (FIG. 2), a plurality of first layers of carbon fibre 20a are deposited on the cylindrical surface of the mould 15 and on a portion of the metal ring 2 comprising the first groove 7 and tooth 9 to produce a first cylindrically-shaped tubular element in carbon fibre provided with an end portion that engages the first groove 7, covers tooth 9 and abuts against the wall of the second tooth 10 facing the first groove 7.

The first tubular element normally has a constant thickness, for example 3 mm.

A layer of syntactic material 22, configured to transfer high radial stresses without becoming appreciably deformed, is deposited on the first tubular element in carbon fibre. The layer of syntactic material is a continuous layer of constant thickness (for example 10 mm) that envelopes the first tubular element, creating a tubular element in a syntactic material coaxial to axis 4.

Typically, the syntactic material é formed from an epoxy resin reinforced with glass microspheres and has a density in the order of 420 kg/m$^3$, while for other requirements, materials with densities varying between 50 and 800 kg/m$^3$ can be used.

A plurality of layers of carbon fibre 20c (FIG. 4) are then deposited on top of the portion of the first tubular body that engages the first groove 7 until the diameter of the tooth 10 is reached to produce a first annular portion for clamping the first tubular body on the ring 2.

Then a plurality of second layers of carbon fibre 20b are deposited (FIG. 4) on the layer of syntactic material 22, on the first clamping portion and on a portion of the ring 2 comprising the second groove 8 to produce a second cylindrically-shaped tubular element in carbon fibre (for example with a thickness of 4 mm) provided with an end portion that engages the second groove 8 and abuts against a shoulder 17 of the groove 8. In this way, the second tubular element in carbon fibre houses the first tubular element in carbon fibre and the layer of syntactic material 22.

Finally, a plurality of carbon fibre layers 20d (FIG. 5) are deposited on top of the portion of the second tubular body that engages the second groove 8 until the diameter of the shoulder 17 is reached, to produce a second annular portion for clamping the second tubular body on the ring 2.

Then the mould 15 supporting the ring 2 and the layers of carbon fibre are put in an autoclave and subjected to a vacuum heating cycle. In this way, the first and second tubular elements and the first and second clamping rings are subjected to a heating cycle to perform polymerization of the carbon fibre that adheres intimately with the layer of syntactic material 22, producing a tubular casing in which a single solidified tubular portion of carbon fibre is provided internally with an intermediate tubular portion formed by the syntactic material 22 and having an end portion that engages the first and second grooves 7 and 8 and covers the teeth 9 and 10.

Finally, after having collapsed the sectors forming the mould, the mould 15 is removed from the tubular casing.

Then mechanical machining is performed on the outer surface of the tubular casing using machine tools in order to produce an even cylindrical surface perfectly coaxial to axis 4. The metal rings 2 are also machined in this step to obtain the desired precision. This operation is performed using known techniques note (FIG. 6).

During the mechanical machining, an annular groove 30 (FIG. 5) can be made in the outer surface region of the tubular casing in the interface region between the metal ring 2 and the solidified carbon-fibre portion (shoulder 17). Further anodizing is performed to protect the machined metal parts, while the fibre parts are coated with paint.

Groove 30 is engaged by a synthetic sealing material 31.

The portion of the casing opposite to that to which the ring 2 is fixed can be provided with a similar ring, which is fastened using a similar process (see FIG. 8). Alternatively, the opposite portion can be closed with surfaces made of carbon fibre that are spherical, torispherical, conical, etc.

The tubular casing produced using the above-described method has numerous advantages, including:

high resistance to axial and circumferential loads. The presence of the first and second grooves 7 and 8, inside which the material that forms the carbon-fibre portion also penetrates, creates an extremely stable interface between the ring and the carbon-fibre portion;

chemical stability. The presence of aluminum oxide 12 produces a protective barrier between the ring 2 and the carbon fibre, preventing degradation of the carbon fibre-aluminum joint due to chemical processes; and high rigidity and immunity to buckling phenomena.

Regarding this last aspect indicated above, it should be remembered that a closed cylindrical casing of radius R and thickness T subjected to an external pressure P exhibits the following stresses:

circumferential stress=$\sigma circ$=$-P*R/T$ axial stress=$\sigma ass$=$-P*R/(2T)$ radial stress=from 0 to $-P$ All of these are compressive stresses, with the circumferential and axial ones also having significantly higher values than the radial ones. Therefore, both circumferential and axial compression can result in buckling of the cylindrical surface and the probable collapse of the entire structure. To counter this phenomenon, it is necessary to increase the moment of inertia of the casing's resistant section. In torpedoes produced according to the known art, the increase in the moment of inertia is obtained by providing a plurality of annular internal ribs that extend towards to the axis of the casing.

According to the present invention, the increase in the moment of inertia is achieved by dividing the thickness of the resistant material (carbon fibre) into two layers and separating them by interposing a layer of syntactic or equivalent material.

As a whole, the method of the present invention produces a synergetic effect that enables solving the following problems:

eliminating mechanical sealing problems due to the metal-carbon fibre interface;

eliminating chemical compatibility problems due to the metal-carbon fibre interface; and increasing the structure's buckling resistance.

According to the variant in FIG. 7, the layer of material 22 is not continuous, but is formed by tubular portions of very low density material 22, separated from each other by the tubular-shaped filling material 23. The sole purpose of material 22 is that of keeping the carbon fibre 20b in position during all the operational steps, while material 23 is assigned the task of transferring loads from the outermost tubular element to the innermost one, and is usually made of carbon fibre. The pitch between the rings of material 23 depends on the increase in stress that can be accepted on the inner and outer tubular elements; overstressing increases with the increase in pitch. The pitch is usually comprised between $0.75*(R*T)^{1/2}$ and $5*(R*T)^{1/2}$; $1.2*(R*T)^{1/2}$ is the most used value. The minimum width of the ring is evaluated on the basis of the capacity to transfer a radial load related to a span from the outer ring to the inner one.

According to a further variant (not shown), tooth 9 is provided with a plurality of notches arranged in angularly different positions on the tooth and made to improve the torsional resistance between the carbon-fibre portion and the ring 2.

In alternative to carbon fibre, other impregnated fibres can be used, such as glass fibre, Kevlar, long chain polyethylene fibres and fibrous metals.

In the embodiment shown, the polymerization of the first and second tubular elements and of the layer of syntactic material 22 is implemented simultaneously, by subjecting these elements to joint heating.

Alternatively, the method could comprise intermediate polymerizations whereby the polymerization of the first tubular element, of the layer of syntactic material 22 deposited on the hardened first tubular element and finally the polymerization of the second tubular element are performed consecutively.

The invention claimed is:

1. A method of making a tubular casing for an underwater device, the method comprising:
    preparing at least one metal ring including a tubular wall coaxial to an axis of symmetry; the tubular wall having, on an outside-facing surface thereof, a first groove and a second groove spaced axially and radially with respect to the first groove;
    subjecting the at least one metal ring to an anodizing process that produces an insulating layer of oxide that covers outer surfaces of the at least one metal ring;
    coupling the at least one metal ring with a mold that defines a cylindrical supporting surface coaxial to the axis of symmetry;
    depositing a plurality of first layers of fiber on the cylindrical portion of the mold and on a portion of the at least one metal ring including the first groove to produce a first cylindrically-shaped tubular element in fiber provided with an end portion that engages the first groove;
    depositing on the first tubular element in fiber at least one layer of synthetic configured to transfer radial forces;
    depositing a plurality of second layers of fiber on the layer of synthetic material and on a portion of the at least one metal ring comprising the second groove to produce a second cylindrically-shaped tubular element in fiber provided with an end portion that engages the second groove; the second tubular element in fiber housing the first tubular element in fiber and the layer of synthetic or equivalent material;
    subjecting the first and second tubular elements to a heating cycle so as to perform polymerization of the fiber that adheres intimately with the layer of synthetic material producing the tubular casing in which a solidified portion of fiber is provided internally with an intermediate portion formed by the synthetic material and having an end portion that engages the first and the second groove; and
    removing the mold from the tubular casing.

2. The method according to claim 1, further comprising depositing a plurality of third layers of fiber on top of the portion of the first tubular body that engages the first groove to produce an annular portion for clamping the first tubular body on the at least one metal ring.

3. The method according to claim 2, further comprising depositing a plurality of fourth layers of fiber on top of the portion of the second tubular body that engages the second groove to produce an annular portion for clamping the second tubular body on the at least one metal ring.

4. The method according to claim 1, further comprising a machining operation of the outer surface of the tubular casing and of the at least one metal ring in order to obtain the desired precision.

5. The method according to claim 4, wherein a groove is produced in the outer surface region of the tubular casing in the interface region between the at least one metal ring and the solidified fiber portion; the groove being engaged by a sealing material.

6. The method according to claim 1, wherein the synthetic material includes an epoxy resin reinforced with glass microspheres.

7. The method according to claim 1, wherein the synthetic material includes an expanded material with density of between 50 kg/m$^3$ and 800 kg/m$^3$.

8. The method according to claim 1, wherein the layer of synthetic material includes a continuous layer that envelopes the first tubular element.

9. The method according to claim 1, wherein the layer of synthetic material is formed of portions of synthetic material, each of the portions of synthetic material separated from an adjacent portion by filling material.

10. The method according to claim 1, wherein the first groove is limited, on a first side facing the outside of the annular body by a first tooth; the first and the second groove are separated in radial and axial directions by a portion of the annular body that produces a second tooth, which limits the first groove on a second side.

11. The method according to claim 1, wherein the first or second layer of fiber includes carbon fiber, glass fiber, Kevlar, fibers of plastic materials, metal fiber, or combinations thereof.

12. The method according to claim 1, wherein the polymerization of the first and second tubular elements and of the layer of synthetic material is performed substantially simultaneously by subjecting the first and second tubular elements and the layer of synthetic material elements to combined heating.

13. The method according to claim 1, wherein intermediate polymerizations are provided whereby polymerization of the first tubular element, of the layer of synthetic material deposited on the hardened first tubular element and finally polymerization of the second tubular element are performed consecutively.

14. The method according to claim 4, wherein, after the final machining, further anodizing of the metal parts of the at least one metal ring is performed.

15. The method according to claim 4, wherein the underwater device includes a torpedo.

* * * * *